United States Patent
Beckman et al.

(10) Patent No.: US 9,567,081 B1
(45) Date of Patent: Feb. 14, 2017

(54) MANEUVERING A PACKAGE FOLLOWING IN-FLIGHT RELEASE FROM AN UNMANNED AERIAL VEHICLE (UAV)

(71) Applicant: Amazon Technologies, Inc., Seattle, WA (US)

(72) Inventors: Brian C. Beckman, Newcastle, WA (US); Menashe Haskin, Kfar Vitkin (IL); Michael Rolnik, Geva Binyamin (IL); Yan Vule, Modi'in (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,671

(22) Filed: Jun. 26, 2015

(51) Int. Cl.
| | |
|---|---|
| *B64C 1/20* | (2006.01) |
| *B64C 1/22* | (2006.01) |
| *B64D 47/00* | (2006.01) |
| *B64D 1/12* | (2006.01) |
| *B64C 39/02* | (2006.01) |
| *B64D 1/10* | (2006.01) |

(52) U.S. Cl.
CPC ............... *B64D 1/12* (2013.01); *B64C 39/024* (2013.01); *B64D 1/10* (2013.01); *B64C 2201/128* (2013.01)

(58) Field of Classification Search
CPC ............... B64D 1/00; B64D 1/02; B64D 1/08; B64D 1/10; B64D 1/12; B64D 9/00; B64D 19/00; B64C 39/024; B64C 2201/027; B64C 2201/12; B64C 2201/128
See application file for complete search history.

(56) References Cited

U.S. PATENT DOCUMENTS

| | | | | |
|---|---|---|---|---|
| 3,168,267 A | * | 2/1965 | Ferris ....................... | B64D 1/02 244/138 A |
| 5,947,419 A | * | 9/1999 | Warren .................... | B64D 1/02 102/384 |
| 6,942,184 B1 | * | 9/2005 | Morris ..................... | B64D 1/02 244/138 R |
| 9,174,733 B1 | * | 11/2015 | Burgess ................... | B64D 1/12 |
| 9,174,738 B1 | * | 11/2015 | Roach ....................... | B64B 1/40 |
| 9,321,531 B1 | * | 4/2016 | Takayama ................ | B64D 1/12 |
| 2004/0051006 A1 | * | 3/2004 | Warren .................. | B64D 19/00 244/138 R |
| 2005/0230555 A1 | * | 10/2005 | Strong ................. | B64D 17/343 244/152 |
| 2007/0018033 A1 | * | 1/2007 | Fanucci ................ | F42B 10/143 244/3.27 |

(Continued)

*Primary Examiner* — Richard G Davis
(74) *Attorney, Agent, or Firm* — Lee & Hayes, PLLC

(57) ABSTRACT

A package delivery system can be implemented to forcefully propel a package from an unmanned aerial vehicle (UAV), while the UAV is in motion. The UAV can apply a force onto the package that alters its descent trajectory from a parabolic path to a vertical descent path. The package delivery system can apply the force onto the package in a number of different ways. For example, pneumatic actuators, electromagnets, spring coils, and parachutes can generate the force that establishes the vertical descent path of the package. Further, the package delivery system can also monitor the package during its vertical descent. The package can be equipped with one or more control surfaces. Instructions can be transmitted from the UAV via an RF module that cause the one or more controls surfaces to alter the vertical descent path of the package to avoid obstructions or to regain a stable orientation.

20 Claims, 14 Drawing Sheets

(56) References Cited

U.S. PATENT DOCUMENTS

2007/0029439 A1\* 2/2007 Merems ................ B64D 19/02
244/7 R
2009/0026319 A1\* 1/2009 Strong ................ B64C 39/024
244/152

\* cited by examiner

US 9,567,081 B1

MANEUVERING A PACKAGE FOLLOWING IN-FLIGHT RELEASE FROM AN UNMANNED AERIAL VEHICLE (UAV)

BACKGROUND

Historically, package delivery systems rely on a spoke-hub distribution model. For example, to ship a package between an origin and destination, a vehicle has to pick-up the parcel and deliver it to a sorting center before commencing a final delivery destination. This model works well for reducing the cost of shipment when it is possible to aggregate packages that share a big part of the journey from origin to destination. However, it becomes inefficient, if the ability to aggregate packages is diminished because of a lack of proximity between delivery destinations. Further inefficiencies are apparent when transportation infrastructure itself does not allow for direct routes between an origin and destination.

The use of Unmanned Aerial Vehicles (UAV) can overcome some of these inefficiencies by leveraging more flexible aerial transportation paths between destinations, rather than relying on rigid road infrastructure. Flexible flight plans allow for more direct delivery routes, and in some cases, an aggregation of more packages that share delivery destinations that are in close proximity to one another. However, the use of UAVs presents their own inefficiencies. In order to deliver a package to a destination, a UAV is required to 'drop off' the package. Traditionally, this involves the UAV landing at the destination, releasing the package, and then taking off to its next destination. The sequence of landing and taking off for each package delivery creates time and energy resource inefficiencies, which negate at least a portion of the benefit of adopting a network system of UAVs.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 further illustrates causing the package to adopt a vertical descent path from the UAV, while also causing the package to deploy a control surface to maneuver the package in an intended direction prior to landing.

In FIG. 2A, the package is attached onto the UAV is a transportation configuration. In FIG. 2B, the launch mechanism applies a force onto the package, forcefully propelling the package from the UAV.

In FIG. 3A, a parachute is deployed from a side of the package to force the package to slide along a guide rail of the UAV. In FIG. 3B, the force generated by the parachute causes the package to dislodge from the UAV. In FIG. 3C, the parachute dislodges from the package, causing the package to commence its vertical descent trajectory.

In FIG. 4A, the package is attached onto the lever arm in a transportation configuration. In FIG. 4B, the launch mechanism applies a force onto the package by moving the coupling structure along the guide rail and rotating the lever arm about its pivot point. FIG. 4C illustrates a side elevation view of a UAV with a wire coil assembly. In some embodiments, the package can be attached to a coil of wire that can lower the package towards ground level. FIG. 4C further depicts an embodiment whereby the coil of wire is secured onto a flywheel assembly that rotates in a circular motion. In doing so, the circular motion of the coil of wire can initiate a centripetal force on the package that progressively increases while the package is lowered.

FIG. 5A illustrates a side elevation view of the package. The package includes a unique marking on each side surface and a plurality of control surfaces that may be deployed to change a direction of the package during freefall to the ground. FIG. 5A further illustrates a deployment of one or more control surfaces. FIG. 5B is a top plan view of the package that illustrates the unique marking on the lid of the package and a top plan view of the plurality of control surfaces. FIG. 5C illustrates a side elevation view of the package with top side control surfaces that deploy from a lid of the package. FIG. 5C further illustrates one top side control surface in a deployed position, and one top side control surface in a stowed position. FIG. 5D is a top plan view of four top side control surfaces installed on the package. FIG. 5E illustrates a side elevation view of the package with a plurality of vertical fins. FIG. 5F illustrates a top plan view of package with four vertical fins. FIG. 5F further illustrates two vertical fins in a deployed position and two vertical fins in a stowed position. FIG. 5G illustrates a side elevation view of the package with a plurality of parachutes in a deployed position.

FIG. 6A is a side elevation view of a package that includes a color imprint on each side surface and a plurality of compressed air canisters attached to each side of the package. FIG. 6B is a top plan view of the package that illustrates a color imprint on a lid of the package and a top plan view of the plurality of compressed air canisters attached to each side of the package.

DETAILED DESCRIPTION

Figure 1:
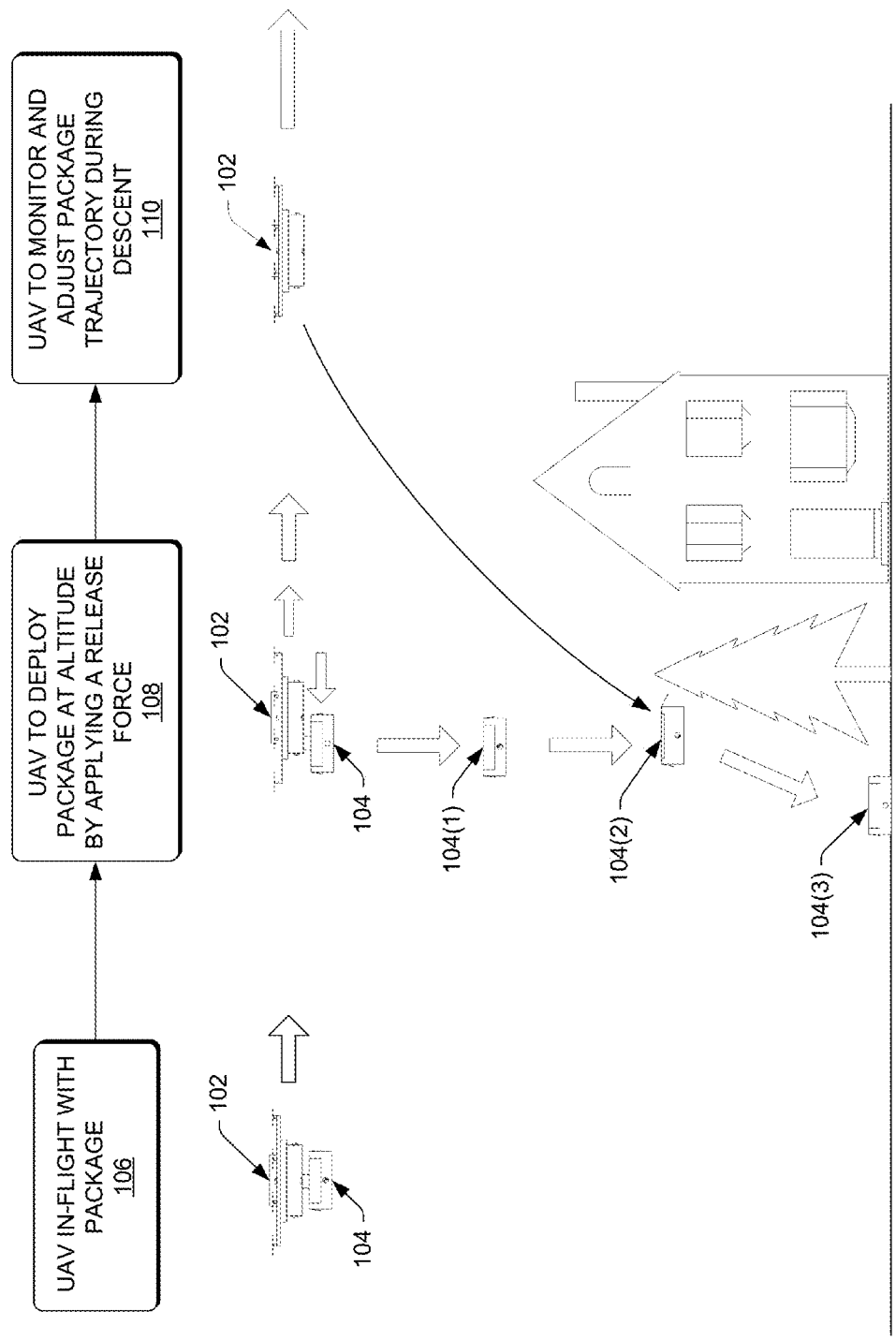
FIG. 1 is a pictorial flow diagram of an illustrative process of forcefully propelling a package from an Unmanned Flight Vehicle (UAV) while the UAV is still in motion.

This disclosure provides a package delivery system that forcefully propels packages from an unmanned aerial vehicle (UAV), while the UAV is in motion. The UAV can apply a force onto the package that is sufficient to alter the descent trajectory of the package from a parabolic path to a vertical descent path.

If a package is dropped from the UAV, while the UAV is in motion, the descent path of the package will follow a parabolic trajectory unless the package is forcefully ejected or released from the UAV. The slope of the parabolic trajectory is influenced by the acceleration of the UAV at the time the package is released. To a lesser extent, air resistance in the form of drag and wind can also affect the shape and slope of the descent path. This disclosure describes a number of ways by which a force can be applied onto the package at the time the package is released from the UAV. The applied force is intended to be equal and opposite the acceleration of the UAV motion such that the resulting package descent path is a vertical descent trajectory.

A technical advantage of incorporating a package delivery system into a UAV is that the sequence of a UAV landing and taking off for each package delivery can be eliminated, thereby creating time and energy resource efficiencies that improve the benefit of adopting a network system of UAVs. Further, an ability to cause a package to descend through a vertical trajectory rather than a parabolic trajectory can be advantageous when attempting a delivery in an area with limited open space, such as an alley or a fenced back yard.

In some embodiments, the package can include a unique marking on a plurality of external surfaces. The unique marks on each side surface of the package can be different in color. An advantage of using different colors is that when viewed from the UAV, the UAV can confirm the trajectory path of the package by determining which unique marks of the package that are visible through an optical sensor. In various examples, the UAV can transmit instructions to the package via a radio frequency (RF) transmitter. The instructions can include deploying one or more control surfaces that are a part of the package. In various examples, the one or more control surfaces can include flat panels that protrude into the airstream to generate a drag force. In some examples, the one or more control surfaces may retain an airfoil cross-section, similar to flaps and slats on a fixed wing aircraft. In other examples, the one or more control surfaces can include parachutes, or compressed air canisters. As discussed in more detail below, the one or more control surfaces can alter the vertical descent path of the package to avoid obstructions, such as trees, or other structures such as carports, balconies, power lines, eaves, etc. In other examples, the vertical descent path can be altered to slip the package onto a balcony of high-rise building.

The techniques, apparatus, and systems described herein may be implemented in a number of ways. Example implementations are provided below with reference to the following figures.

FIG. 1 is a pictorial flow diagram that illustrates a process of forcefully propelling a package from a UAV 102 while in motion to deliver the package 104 to a destination that is directly beneath the UAV. The UAV 102 can be winged-craft, a rotor-craft, or hybrid aircraft that is capable of transporting packages by air from an origination location (e.g. at a fulfillment center or near a fulfillment center) to a destination and returning to the origination location.

At block 106, the UAV 102 can be loaded with a package 104 for delivery to a destination. In some examples, the package can be coupled to a package launch mechanism that is part of the UAV 102. As described in more detail in FIG. 2, the package launch mechanism can apply a force onto the package at the time the package is released from the UAV 102. In some examples, the applied force can alter the descent trajectory of the package.

At block 108, the UAV 102 can release the package while the UAV is in motion and flying at a particular altitude. In some examples, the particular altitude can range from 10-20 feet above the delivery destination. In other examples, the particular altitude can be 500 ft. above the delivery destination. At block 108, the UAV 102 can apply a release force onto the package, via a package launch mechanism. The release force can be substantially equal and opposite to a force that is equivalent to the acceleration of the UAV 102. In doing so, resultant force on the package 104 can cause the descent trajectory of the package 104 to change from a parabolic trajectory that runs in the direction of the UAV 102, to a vertical descent trajectory.

In various examples, the force applied onto the package can be is less than or greater than a force equivalent to the acceleration of the UAV 102. In one non-limiting example, the UAV 102 may be flying into a headwind. A headwind can alter the shape of the package descent path from a parabolic trajectory to a more vertical descent path. In this example, the force applied onto the package can be reduced by compensating for the change in descent path that has been caused by the headwind. Alternatively, the UAV 102 may be flying into a tailwind, which causes the shape of the package descent path to reflect a longer parabolic trajectory. In this alternate example, the force applied onto the package can be increased to negate the effect of the tail wind as well as the acceleration of the UAV 102.

In some examples, the release force applied onto the package can be varied to compensate for other factors, such as aerodynamic drag on the package. In various packages, packages can be subject to aerodynamic drag. Aerodynamic drag can cause a package to decelerate in a horizontal direction, thereby creating a steeper parabolic descent path than what would normally occur in the absence of such drag. Therefore, a consequence of the deceleration is that the release force applied by the UAV 102 can be reduced by compensating for the change in the descent path that has been caused by the aerodynamic drag.

In various examples, the amount of release force applied by the UAV 102 can be proportional to the surface area of the package 104 that is perpendicular to the horizontal motion of the UAV 102. For example, the amount of deceleration caused by aerodynamic drag is proportional to the surface area of the package that is perpendicular to the horizontal motion of the UAV 102. Therefore, a package with a large surface area that is perpendicular to the horizontal motion of the UAV 102 can induce a significant amount of drag, causing the descent path of the package to tend more closely towards a vertical descent path. As a result, the release force applied by the UAV 102 can be further reduced by compensating for the aerodynamic drag caused by a larger surface area.

Moreover, at block 108, an advantage of applying a release force onto a package 104 is that an equal and opposite reaction force is applied onto the UAV 102. The reaction force occurs in a direction that corresponds to the horizontal motion of UAV 102. Therefore, by applying a release force onto the package 104, UAV 102 can receive a boost of acceleration in its direction of motion. The boost of acceleration can assist the UAV 102 to climb to a higher cruise altitude or accelerate at the current cruise altitude towards its next destination.

At block 110, the UAV 102 can monitor the descent path of the package 104 can cause a deployment of one or more control surfaces that adjust the descent path of the package 104. In various examples, the one or more control surfaces can include flat panels that protrude into the airstream to generate a drag force. In some examples, the one or more control surfaces may retain an airfoil cross-section, similar to flaps and slats on a fixed wing aircraft. In other examples, the one or more control surfaces can include parachutes, or compressed air canisters. In some examples, the vertical descent path can be altered to avoid obstructions, such as trees, or other structures such as carports. In some examples, the UAV 102 can be equipped with a radio frequency transmitter that can transmit a radio signal to the package 104. The radio signal can cause the deployment of the one or more control surfaces.

In some examples, the UAV 102 can be further equipped with one or more optical sensors, such as a digital camera, that monitors the package 104 during its descent. As discussed in more detail below in FIG. 5, the optical sensors can monitor a view of unique marks of the package. In some examples, the package 104 can include unique marks on each top, bottom, and side surface. The unique marks on each surface can be different in color, such that when viewed via an optical sensor of the UAV 102, the UAV 102 can discern a descent trajectory based on which colors are in view. For example, if the optical sensors intermittently view some unique marks, the UAV 102 may deduce that the package 104 is spinning. In response, the UAV 102 may deploy all control surfaces to stabilize the package descent. In other examples, based on the unique marks that can be viewed from the UAV 102, the UAV 102 may determine that the package is likely to strike an obstruction. In response, the UAV 102 may deploy one or more control surfaces that guide the package to a safer ground location away from the obstruction. For example, when a control surface is deployed, a portion of the control surface protrudes into the airstream. During descent, the protruding portion of the control surface generates drag. The drag subsequently acts as an upward force on the package, causing the package to pivot about its center of gravity and ultimately change trajectory.

Figure 2A:
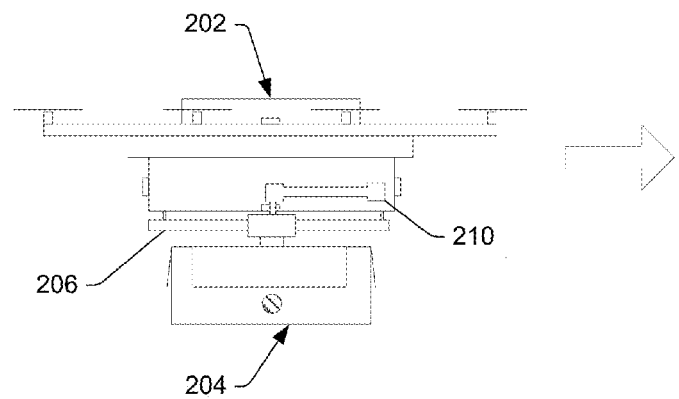
FIGS. 2A and 2B are pictorial flow diagrams of an illustrative launch mechanism on a UAV forcefully propelling a package from the UAV.
Figure 2B:
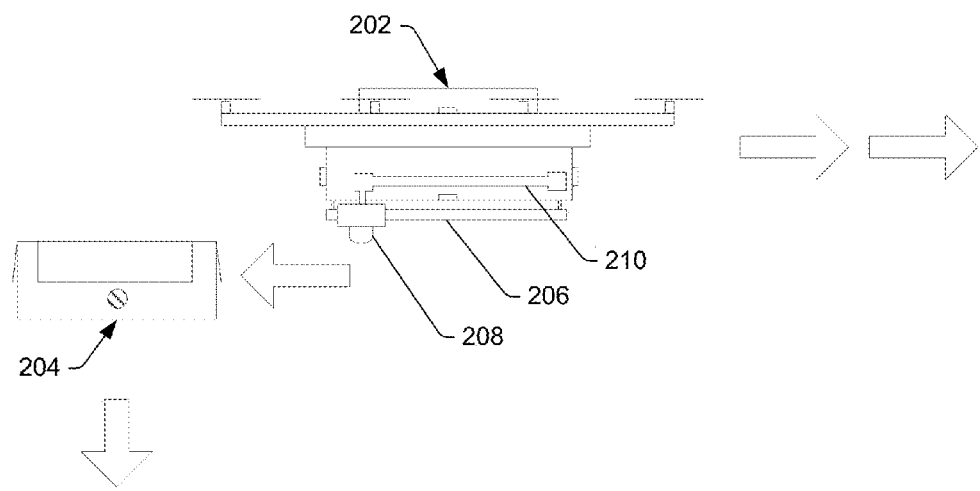

FIGS. 2A and 2B are pictorial flow diagrams of a UAV 202 carrying a package 204 and forcefully propelling the package 204 from the UAV 202 via a launch mechanism. In various examples, the launch mechanism can include a guide rail 206, a coupling structure 208, and an actuator device 210. In some examples, the guide rail 206 can be rigidly attached onto the UAV 202. The guide rail 206 can comprise of a longitudinal member having a uniform cross-section. In various examples, guide rail can be attached to the UAV 202 at each end position. The coupling structure 208 can act as an interface between the package 204 and the UAV 202, by interfacing with the package 104 and the guide rail 206. The coupling structure 208 can include a release joint that interfaces with the package 204. For example, in response to being subjected to a particular force, the coupling structure 208 may dislodge from the package 204. In various examples, the release joint may comprise of a pre-tensioned clamp. In other examples, the release joint may comprise of a ball-socket joint. In both examples, a particular amount of force can cause the pre-tensioned clamp to open or the ball fitting to dislodge from a corresponding socket joint. In some examples, the release force can correspond to the release force that is applied to the package to alter the descent path of the package to a vertical descent trajectory.

In some examples, a cross-section of the coupling structure 208 can include an aperture that is complementary to at least a portion of the guide rail 206 cross-section. In this example, the guide rail 206 can be slotted into the aperture of the coupling structure 208, allowing the coupling structure 208 to traverse along the length of the guide rail 206.

In some examples, the launch mechanism can include an actuator device 210. As illustrated in FIG. 2B, the actuator device 210 can cause the coupling structure 208 to remain in a fixed position along the guide rail 206 during a transportation phase of the package delivery. As illustrated in FIG. 2A, the fixed position can correspond to a position at the longitudinal center of the guide rail 206.

In some examples, the actuator device 210 can cause the coupling structure 208 and attached package 204, to accelerate along the guide rail 206 from a first position to a second position. In the illustrated example, the first position can correspond to a position at the longitudinal center of the guide rail 206. Further, the second position can correspond an end position of the guide rail 206. In various examples, the force applied by the actuator device 210 to the coupling structure 208 can correspond to the force that is required to dislodge the package 204 from the coupling structure 208. In some examples, the force applied by the actuator device 210 can also correspond to the force that is intended to alter the package 204 descent path from a parabolic trajectory to a vertical trajectory.

In various examples, the actuator device 210 can comprise of a pneumatic actuator, a spring actuator, or any other actuator device that is configured to store and release kinetic energy within a predetermined period of time. In some examples, the period of time is proportional to the force that is to be generated by moving the coupling structure 208 over the guide rail 206.

In some examples, the launch mechanism can comprise only of a guide rail 206 and the coupling structure 208. Rather than including an actuator device 210 to forcefully propel the package 204, the launch mechanism can include electro magnets on the guide rail 206 and the coupling structure 208. In some examples, the force required to propel the package 204 from the UAV 202 can be applied by causing a current to flow through the electro magnets. In this example, the amount of force applied onto the coupling structure 208 is proportional to the current that flows through the electromagnets.

In other examples, the force required to propel the package 204 from the UAV 202 can be generated by compressed air canisters. In other examples, the force can be generated using a controlled explosion.

In various examples, the release force applied onto the coupling structure 208, by one of the actuator device 210 or electromagnets can cause an equal and opposite reaction force to be applied onto the UAV 202. In some examples, the reaction force can occur in a direction that corresponds to the horizontal motion of UAV 202. Therefore, by applying a release force onto the package 204, the UAV 202 can receive a boost of acceleration in its direction of motion. The boost of acceleration can assist the UAV 202 to climb to a higher cruise altitude or accelerate at the current cruise altitude towards its next destination.

Figure 3A:
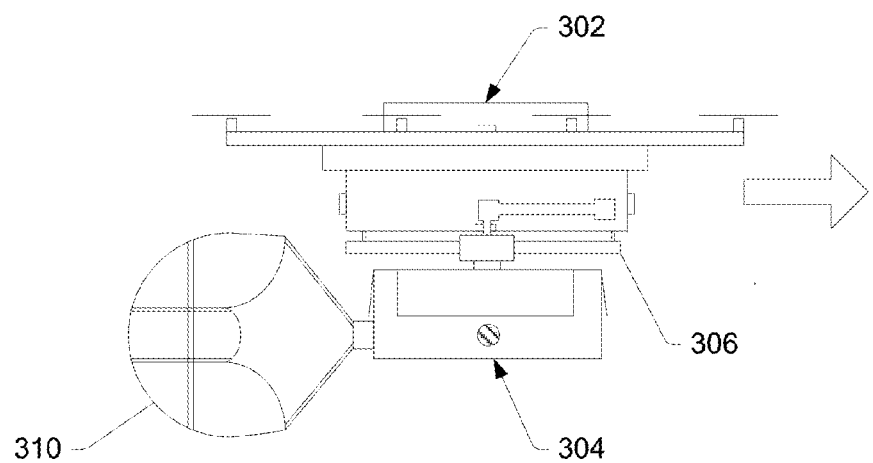
FIGS. 3A, 3B, and 3C are pictorial flow diagrams of an illustrative package launch mechanism that uses a parachute to forcefully launch the package from the UAV.
Figure 3B:
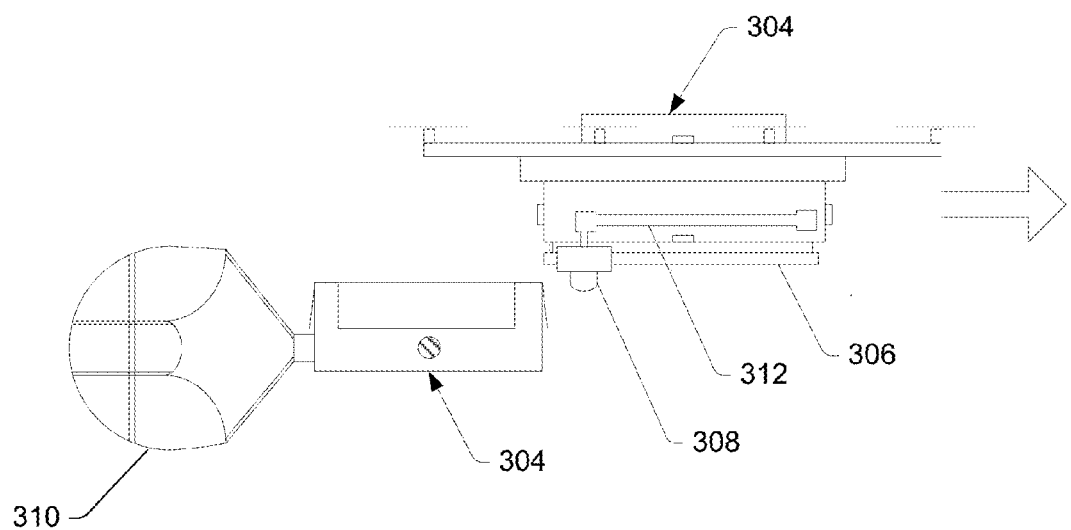
Figure 3C:
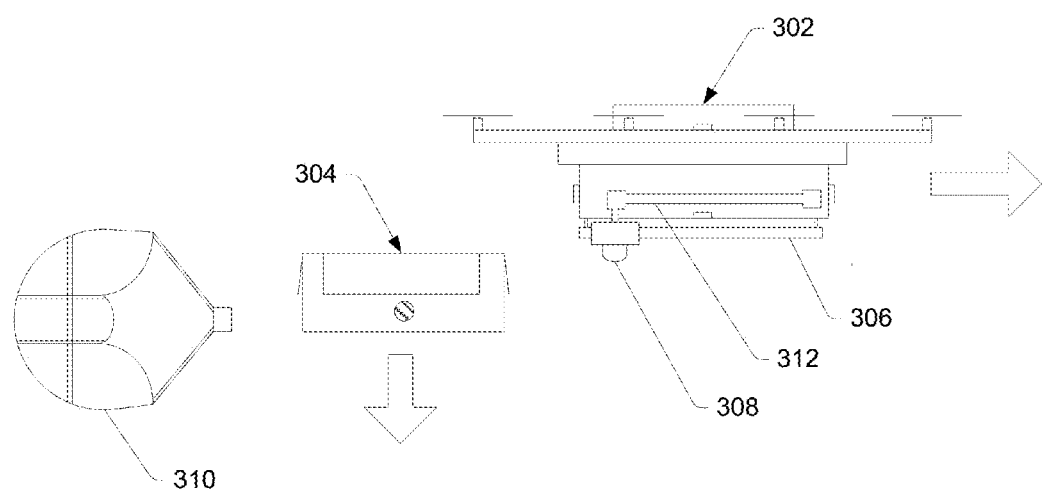

FIG. 3 is a pictorial view of a UAV 302 carrying a package 304, and forcefully propelling the package 304 from the UAV 302 via a launch mechanism. In various examples, the launch mechanism can include a guide rail 306, a coupling structure 308, and a parachute 310. In some examples, the guide rail 306 can correspond to guide rail 206. The guide rail 306 can comprise of a longitudinal member having a uniform cross-section. In various examples, the guide rail 306 can be attached to the UAV 302 at each end position.

The coupling structure 308 can correspond to coupling structure 208. In various examples, the coupling structure can acts as an interface between the package 304 and the UAV 302, by interfacing between the package 304 and the guide rail 306. The coupling structure 308 can include a release joint that interfaces with the package 304, such as but not limited to a pre-tensioned clamp or a ball socket joint.

In some examples, the launch mechanism can also include a parachute 310. The UAV 302 can cause parachute 310 to deploy once the UAV 302 is at a particular altitude over the delivery destination. In some examples, the UAV 302 can include an electronic parachute deployment system, which causes the parachute to deploy at a time when the UAV 302 is at the particular altitude over the delivery destination. In other examples, the parachute 310 can be mechanically deployed by pulling a release cord on the parachute 310. For example, the launch mechanism can include an actuator device 312 that causes the coupling structure 308 to traverse along the guide rail 306. In some examples, the release cord on the parachute 310 can be coupled to a fixed position on the UAV 302 such that a predetermined displacement of the coupling structure 308 along the guide rail 306 can cause the parachute 310 to mechanically deploy.

In various examples, the actuator device 312 can correspond to actuator device 210. The actuator device 312 can comprise of a pneumatic actuator, a spring actuator, or any other actuator device that is configured to store and release kinetic energy within a predetermined time period.

In various examples, the parachute 310 is deployed while the UAV 302 is still in motion. Therefore, since the parachute 310 is deployed in the horizontal plane, the parachute 310 can generate a drag force that is equal and opposite to a force equivalent to the acceleration of the UAV 302. In doing so, the resultant force on the package 304 can cause the descent trajectory of the package 304 to change from a parabolic trajectory that runs in the direction of the UAV 302, to a vertical descent trajectory.

Moreover, unlike the release force applied by actuator devices described in FIG. 2, the drag force generated by the parachute 310 does not cause a boost in acceleration that assists the motion of the UAV 302. This is because the UAV 302 does not apply the release force onto the package 304. Instead, the drag force is generated aerodynamically by the deployment of the parachute 310.

In various examples, the drag force generated by the parachute 310 can also correspond to the force required to dislodge the package 304 from the coupling structure 308 of the UAV 302. In some examples, the parachute 310 can be dislodged from the package at the same time the package 304 is dislodged from the coupling structure 308 of the UAV 302. In doing so, this ensures that the deceleration applied to the package 304 is equal and opposite to the horizontal acceleration of the UAV 302.

In some examples, the parachute 310 can remain attached to the package 304 after the package 304 is dislodged from the coupling structure 308 of the UAV 302. In doing so, the parachute 310 can cause the package 304 to further decelerate in the vertical direction during its descent.

Figure 4A:
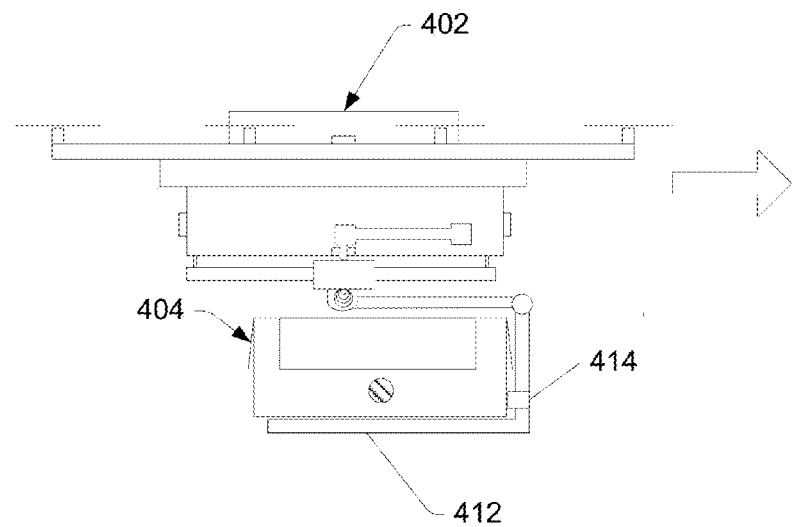
FIGS. 4A, 4B, and 4C are pictorial flow diagrams of an illustrative package launch mechanism that includes a lever arm. The lever arm can amplify the release force that is nominally generated by the motion of a coupling structure along the UAV guide rail.
Figure 4B:
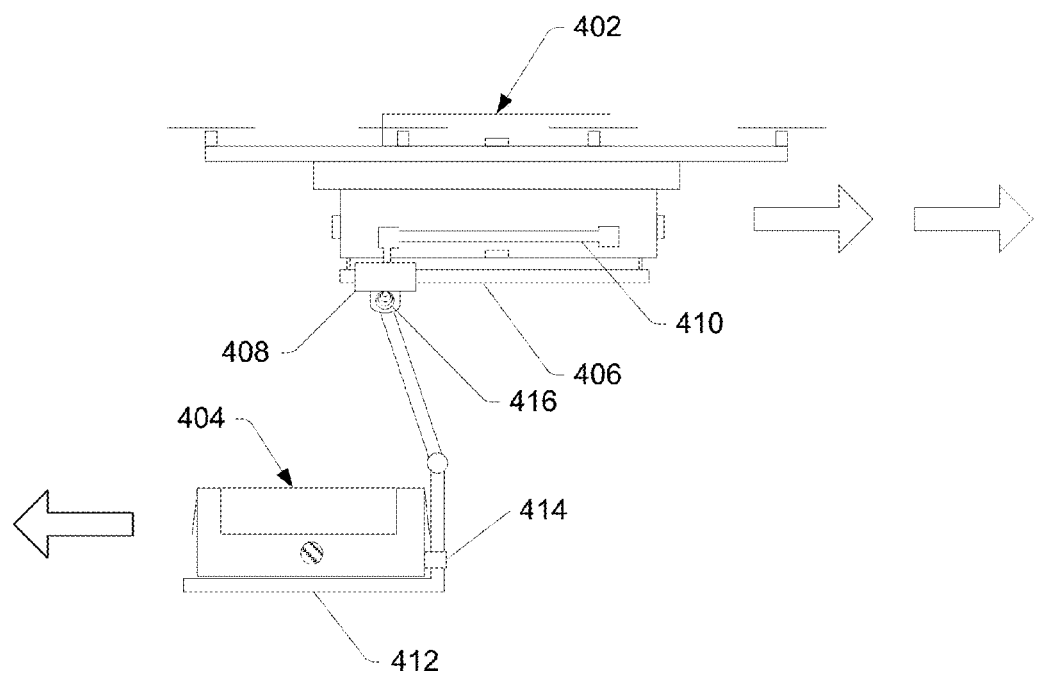

FIGS. 4A and 4B are pictorial flow diagrams of a UAV 402 carrying a package 404 and forcefully propelling the package 404 from the UAV 402 via a launch mechanism that includes a lever arm. In various examples, the launch mechanism can include a guide rail 406, a lever arm pivot structure 408, an actuator device 410, a lever arm 412, and a package attachment structure 414. An advantage of including a lever arm 412 as part of the launching mechanism is that the release force generated by a linear motion of the package 404 along the guide rail 406 can be proportionally amplified by the pivoted length of the lever arm 412. Therefore, if a package 404 requires a release force that exceeds the capability of a launch mechanism, as described in FIGS. 2 and 3, the lever arm configuration, as described in FIGS. 4A and 4B, can be used to amplify the release force capability of the launch mechanism.

In the illustrated example of FIGS. 4A and 4B, the guide rail 406 can correspond to guide rail 206 and 306. The guide rail 406 can comprise of a longitudinal member having a uniform cross-section. The guide rail 406 can be attached to the UAV 402 at each end position.

In the illustrated example, the lever arm pivot structure 408 can provide an interface between the UAV 402 and the lever arm 412. The purpose of the lever arm pivot structure 408 is two-fold. First, the lever arm pivot structure 408 can move along the guide rail 406 to generate a release force that is ultimately transferred to the package 404 at a point of release. The cross-section of the lever arm pivot structure 408 can include an aperture that is complementary to at least a portion of the guide rail 406 cross-section. In this example, the guide rail 406 can be slotted through the aperture of the lever arm pivot structure 408, such that the lever arm pivot structure 408 can move unimpeded along the length the guide rail 406.

Second, the lever arm pivot structure 408 can provide a platform to cause a rotation of the lever arm 412. For example, the lever arm pivot structure 408 can include a spring coil 416 that can cause the lever arm 412 to pivot downwards. In doing so, the rotation of the lever arm 412 can amplify the release force that is nominally generated by the horizontal movement of a lever arm pivot structure 408 along the guide rail 406.

In the illustrated example, the launch mechanism can also include an actuator device 410. In some examples, the actuator device 410 can correspond to actuator device 210 and 312. In some examples, the actuator device 410 can cause the lever arm pivot structure 408 to accelerate along the guide rail 406 from a first position at the longitudinal center of the guide rail 406 to a second position that can correspond to an end position of the guide rail 406.

In the illustrated example, the launch mechanism can also include a package attachment structure 414. The package attachment structure 414 can couple the package 404 to the lever arm 412. The package attachment structure 414 can comprise of a release joint such as a pre-tensioned clamp or a ball socket joint. In various examples, the release joint can uncouple the package 404 from the lever arm 412 at a predetermined force that is equivalent to the release force of the package 404.

In various examples, the combined effect of the lever arm pivot structure 408 moving along the guide rail 406, and the lever arm 412 pivoting about the lever arm pivot structure 408 can cause an amplified release force to be applied onto the package 404 at a point of release. Moreover, the release force that is ultimately applied onto the package can cause an equal and opposite reaction force to be applied onto the UAV 402. In some examples, the reaction force can occur in a direction that corresponds to the horizontal motion of UAV 402. Therefore, by applying a release force onto the package 404, the UAV 402 can receive a boost of acceleration in its direction of motion. The boost of acceleration can assist the UAV 402 to climb to a higher cruise altitude or accelerate at the current cruise altitude towards its next destination.

Figure 4C:
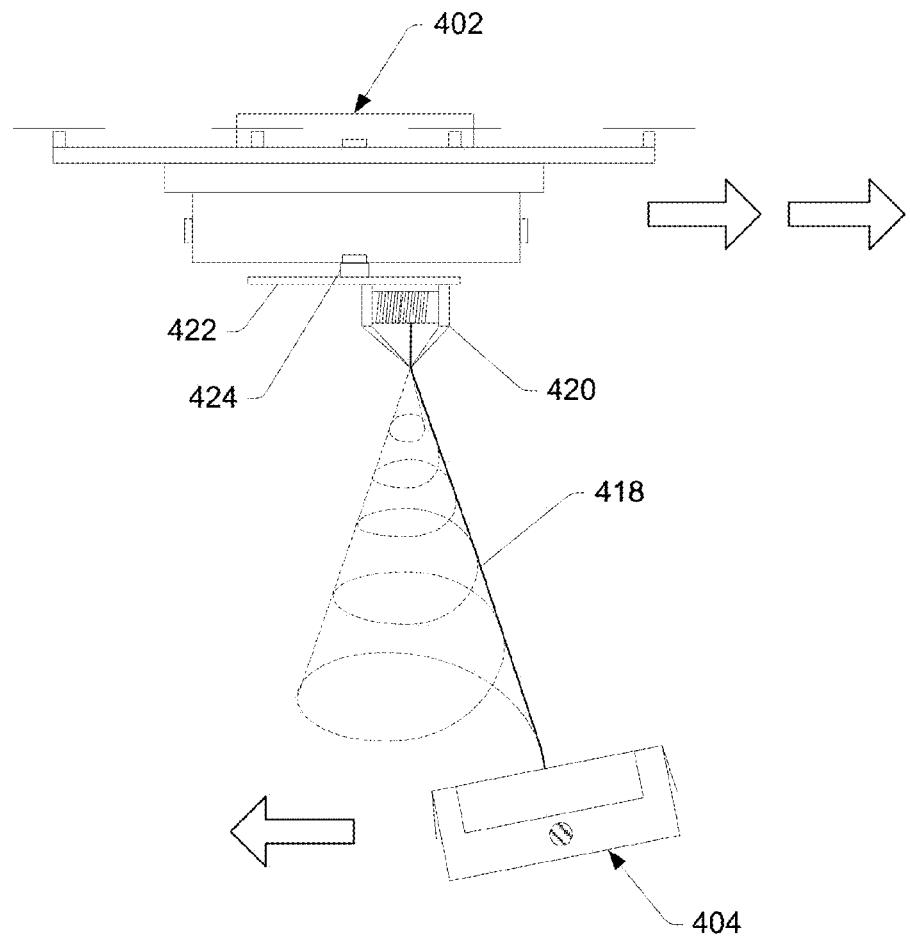

FIG. 4C illustrates a pictorial flow diagram of a UAV 402 deploying a package 404 via an attached line 418. In various examples, a line 418 can include, but is not limited to, a wire, a cable, or a string. In the illustrated example, the UAV 402 can include a coil 420 of wire 418 that lowers the package to height at which the package 404 is released. In some embodiments, the UAV 402 may lower the package 404 to ground level. In other embodiments, the UAV 402 may lower the package to a particular release altitude at which the package 404 is released while the UAV 402 is still in motion.

Figure 4D:
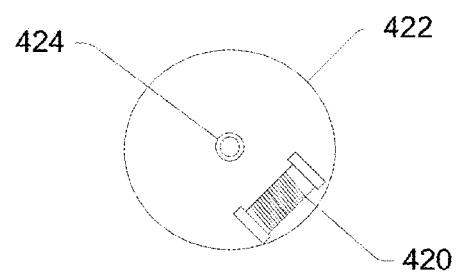
FIG. 4D illustrates a bottom plan view of the coil of wire, flywheel, and electric motor assembly that is used to generate the centripetal force on the package. Note that the main body of the UAV is omitted from FIG. 4D for clarity.

In various examples, the coil 420 of wire 418 can attach onto a flywheel 422 of the UAV 402. As depicted in FIG. 4D, the flywheel 422 may be further coupled to an electric motor 424 that is secured to the underside of the UAV 402. The electric motor 424 can cause the flywheel to rotate about its rotational axis. In doing so, the rotation of the flywheel results in the attached coil 420 rotating about the same rotational axis of the flywheel. In various examples, the circular motion of the coil 420 can initiate a centripetal force on the package 404 while the package 404 is attached to the wire 418. As the package 404 is progressively lowered by the wire 418, the package 404 descent path begins to follow progressively larger spirals, which cause the centripetal force on the package 404 to progressively increase. This action causes the system to operate similar to a "slingatron" launching mechanism.

In some examples, the UAV 402 can release the package 404 in the direction that is opposite to the motion of the UAV 402. The acceleration force applied onto the package 404 at the point in time in which the package 404 is released is developed directly from the generated centripetal force. In some examples, the point in time in which the package 404 is released is based on producing an acceleration force on the package 404 that is equal and opposite to the acceleration force the UAV 402. As a result, the package 404 may follow a vertical descent path to an intended delivery destination. Further, by applying an acceleration force onto the package 404, the UAV 402 can receive a boost of acceleration in its direction of motion. The boost of acceleration can assist the UAV 402 to climb to a higher cruise altitude or accelerate at the current cruise altitude towards its next destination.

Figure 5A:
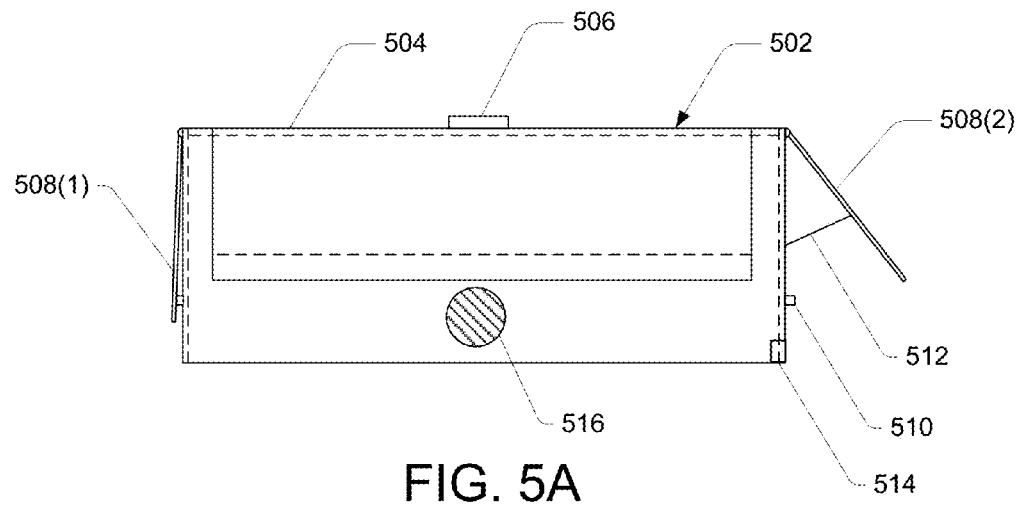
FIGS. 5A through 5G illustrate a package that includes a plurality of control surfaces.

FIGS. 5A through to 5G illustrate various types of packages 502 that can be deployed by a UAV 102, 202, 302 or 402. In various examples, the package 502 can include a plurality of sidewalls that combine to form a receptacle in between and an opening at a top rim. In various examples, items for delivery can be securely positioned within the receptacle of the package 502.

In various examples, items for delivery can be placed within the receptacle of the package 502 in such a way that the package 502 is bottom heavy. A bottom heavy weight distribution can help the package 502 follow a controlled descent after release from the UAV.

In some embodiments, the package 502 can include a lid 504 hinged to the top rim of at least one sidewall. The lid can be formed to cover the opening of the receptacle. In some examples, the lid 504 can be a separate part that is fitted over the opening at the top rim of the receptacle. In other examples, the lid 504 can be integrated into at least one sidewall, such that the lid 504 is formed by folding down a protruding section of at least one sidewall. In some examples, the lid 504 can also be hinged to a section of at least one sidewall that is below the top rim. In other examples, the lid 504 can be hinged to a fixed portion of a top surface of the package 502.

In the illustrated example, package 502 can include a mounting mechanism 506 that is configured to selectively couple to the lid 504. In other examples, the mounting mechanism 506 can be coupled to a sidewall of the package 502 receptacle. The mounting mechanism 506 can interface with the coupling structure 208 or 308 of the UAV, or the package attachment structure 414 of the UAV. In some examples, the mounting mechanism 506 can comprise one-half of a pre-tensioned clamp or one-half of a ball-socket joint. The mounting mechanism 506 can couple the package 502 to the UAV at ground level and selectively uncouple from the UAV during at the package delivery destination.

Figure 5B:
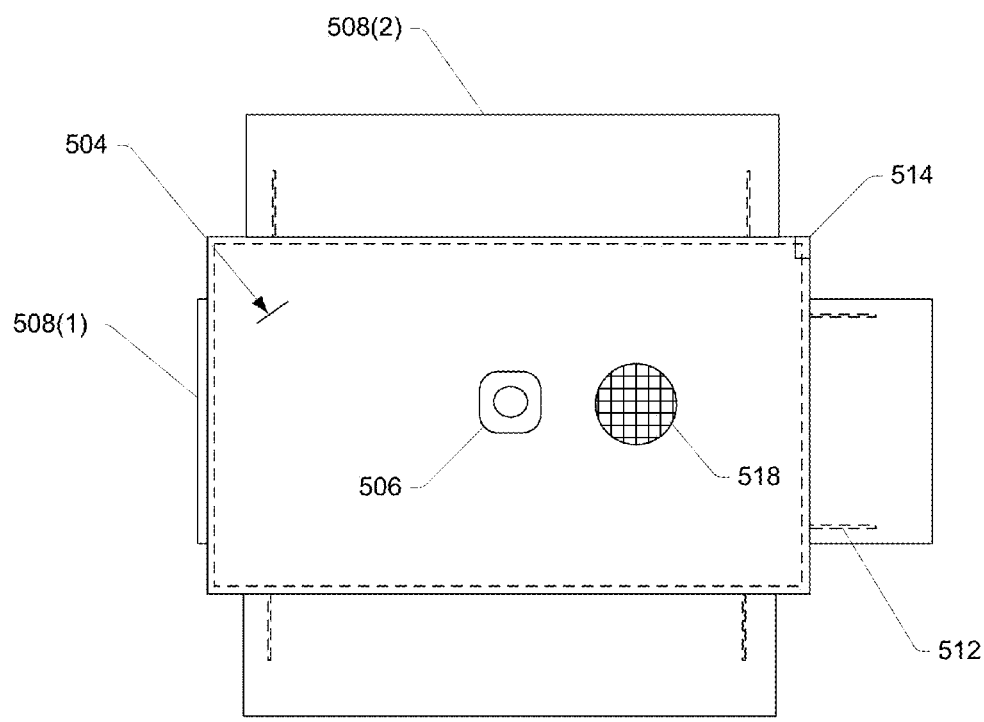

FIGS. 5A and 5B illustrate a package 502 that includes a plurality of sidewall control surfaces 508. In various examples, the sidewall control surfaces 508 can be hinged to one or more edges of a top surface of the package 502. An advantage of hinging the sidewall control surfaces 508 to edges of a top surface is that while the package 502 is descending, upward air resistance can help deploy the sidewall control surfaces 508. In other examples, the sidewall control surfaces 508 can pivot from one or more edges of a bottom surface of the package 502. In this instance, the package may require mechanical controllers to pivot the sidewall control surfaces 508 downward from a closed position to an open position. An advantage of pivoting the control surfaces from a bottom surface of the package 502 is that the sidewall control surfaces 508 can help the package 502 remain upright after landing at the delivery destination. For example, when deployed, the sidewall control surfaces 508 can increase a landing surface area of the package 502. The increase in landing surface area can help prevent the package 502 from turning over onto a sidewall after landing at the delivery destination.

In various examples, the sidewall control surfaces 508 can remain in a closed position during a transportation phase of the UAV. In the closed position, the sidewall control surfaces 508 are stowed proximate to the sidewalls of the package 502 and secured in place by a locking mechanism 510. In some examples, the locking mechanism 510 can be triggered to release a sidewall control surface 508 in response to the package 502 receiving an RF signal.

In some examples, the sidewall control surfaces 508 can include a plurality of cords 512 that further couple each sidewall control surface 508 to a corresponding sidewall of the package 502. The purpose of the plurality of cords 512 is to limit the rotational travel of each sidewall control surface 508 when the sidewall control surface 508 is deployed. In the illustrated example, one sidewall control surface 508(1) is shown in a closed position, while the remaining three sidewall control surfaces 508(2) are shown in an open position. The sidewall control surfaces 508 can remain in a closed position until an instruction is received from the UAV. In some examples, the instruction is sent as an RF signal from the UAV to release the locking mechanism.

In the illustrated example, the package 502 can include a radio frequency (RF) receiver 514. The RF receiver 514 can be coupled to a sidewall surface inside the receptacle of the package 502. In various examples, the RF receiver 514 can be configured to receive a signal from the UAV that corresponds to opening a locking mechanism 510 that corresponds to one or more of the sidewall control surfaces 508.

In the illustrated example, the package 502 can include unique markings 516(1) on each side wall of the package 502 as well as a unique marking 516(2) 518 on the lid 504 surface. In some examples, the unique markings 516 can comprise of different colors, patterns, universal product codes (UPC) or quick response (QR) codes. As discussed in more detail below in FIG. 7, the unique marking 516 on each sidewall and top surface can be different to help the UAV track an orientation and descent path of the package 502.

Figure 5C:
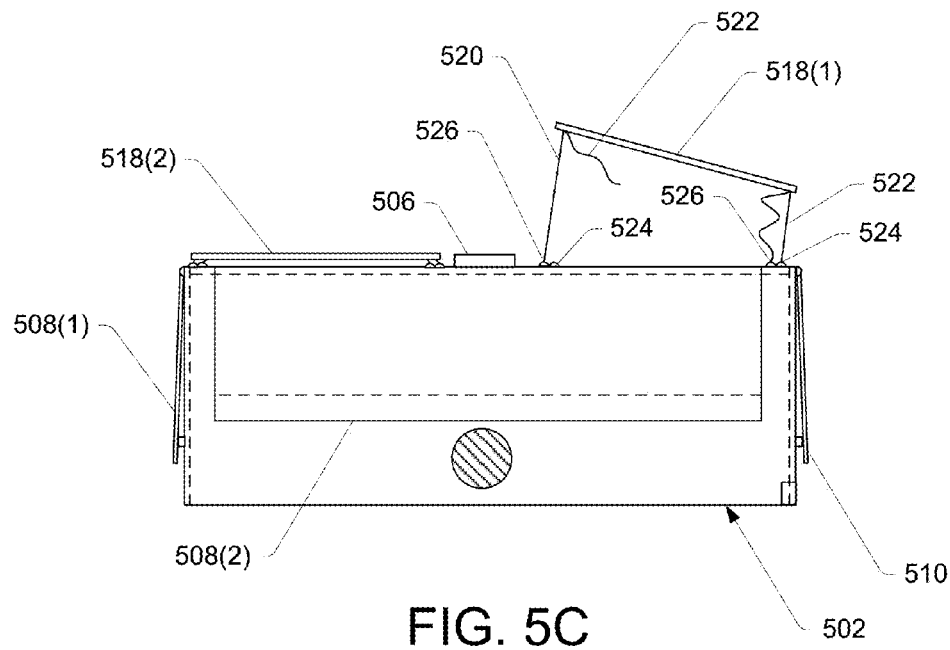

FIG. 5C illustrates a side elevation view of a package 502 that includes top side control surfaces 518 on a lid 504 of the package 502. FIG. 5C depicts the package 502 with one top side control surface 518(1) in a deployed position and a second top side control surface 518(2) in a stowed position. In various examples, the top side control surfaces 518 can be included in combination with the sidewall control surfaces 508 described in FIGS. 5A and 5B. In some examples, the geometry of the sidewall control surfaces 508 may be modified in order to accommodate the vertical fin(s) 528 being stowed against a sidewall of the package 502.

Figure 5D:
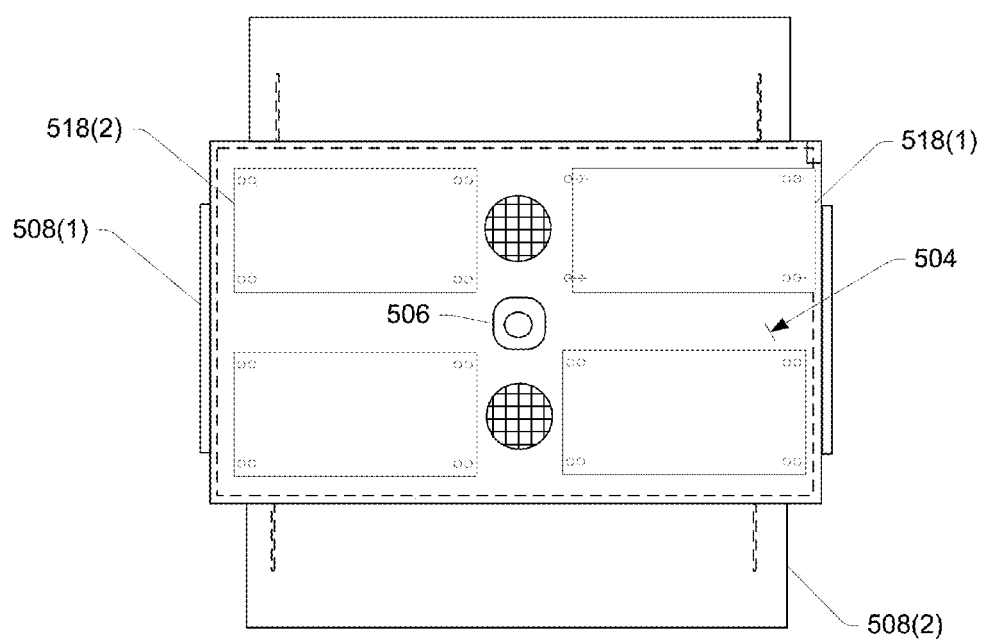

In various examples, the package 502 can include multiple top side control surfaces 518. In the illustrated example, the package 502 is depicted as including four top side control surfaces 518. As shown in FIG. 5D, the top side control surfaces 518 can be positioned adjacent to the mounting mechanism 506. In some examples, the package 502 can include two top side control surfaces 518 that span a length of the package 502 on either side of the mounting mechanism 506. In other examples, the package 502 can include two top side control surfaces 518 that span a width of the package 502 on either side of the mounting mechanism 506. In some examples where the mounting mechanism 506 is located on a bottom surface of the package 502, the package 502 can include one top side control surface 518.

In various examples, each top side control surface 518 can be coupled to the lid 504 of the package 502 using one or more pairs of cords. Each pair of cords can include a long cord 520 and a short cord 522. Each long cord 520 and each short cord 522 can have a first end and a second end. In the illustrated example, the long cord 520 can have a longer length than the short cord 522. In some examples, each top side control surface 518 can be coupled to the lid 504 using a stiffened support members, rather than cords. For example, a stiffened support member can include tension cables or rigid wires that provide the top side control surface 518 a level of rigidity when deployed.

In some examples, each pair of cords can be coupled to separate corners of the top side control surface 518. As discussed in more detail below, the purpose of having a long cord 520 and a short cord 522 is to provide the top side control surface 518 with an angle of attack relative to free stream airflow.

In the illustrated example, each corner of a top side control surface 518 is secured onto the lid 504 of package 502 using both the long cord 520 and the short cord 522. For example, a first end of the long cord 520 and a first end of the short cord 522 can be securely coupled to a corner of a top side control surface 518. Further, the second end of the short cord 522 can be securely coupled to a first release mechanism 524 that is positioned on the lid 504 of the package 502. In various examples, the first release mechanism 524 is intended to release a hold of the second end of the short cord 522 in response to receiving an RF signal from the UAV.

In the illustrated example, the second end of the long cord 520 can be securely attached to the lid 504 of the package 502. Further, a second release mechanism 526 can be positioned on the lid 504 of the package 502 adjacent to the long cord 520 attach point on the lid 504 of the package 502. The second release mechanism 526 can be selectively coupled to a position on the long cord 520 that is near the first end of the long cord 520. In doing so, the long cord 520 length between the top side control surface 518 and the second release mechanism 526 can be minimized, thus holding each corner the top side control surface 518 close to the lid 504 of the package 502.

In various examples, the UAV can simultaneously transmit an RF signal to the first release mechanism 524 that is coupled to the short cord 522 and the second release mechanism 526 that is coupled to the long cord 520. In this example, the first release mechanism 524 can cause the second end of the short cord 522 to release and float in the freestream airflow. Further, the second release mechanism 526 can release the long cord 520 from its coupling position near its first end. In doing so, the corner of the top side control surface 518 can deploy away from the lid 504 of the package 502 by the length of the long cord 520.

In another embodiment, the UAV can transmit an RF signal only to the second release mechanism 526. In this example, the long cord 520 can be released from its coupling position near its first end causing the corner of the top side control surface 518 can deploy away from the lid 504 of the package 502. However, since the first release mechanism 524 has not been triggered, the corner of the top side control surface 518 can only deploy away from the lid 504 of the package 502 by the length of the short cord 522.

In various examples, different combinations of triggering each first release mechanism 524 and each second release mechanism 526 at each corner of a top side control surface 518 can cause the top side control surface 518 to deploy away from the lid 504 of the package 502 at different angles of attack relative to the freestream airflow.

Figure 5E:
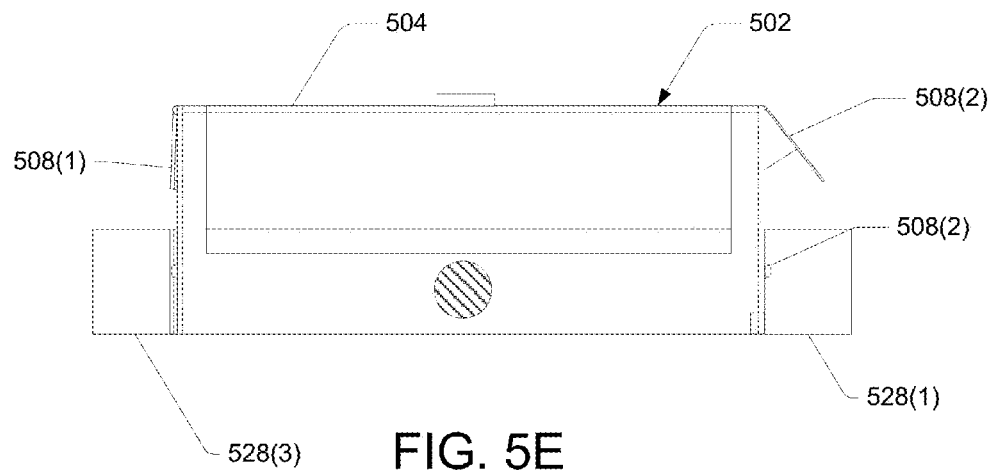

FIG. 5E illustrates an embodiment of the package 502 that can include a plurality of vertical fin(s) 528 that deploy away from the sidewalls of the package 502. An advantage of including vertical fin(s) 528 on the package 502 is that the descent path can be stabilized under circumstances where the package begins to spin or is subject to a turbulent airstream. Another advantage of deploying the fins prior to landing is that the landing surface area of the package 502 is increased when the vertical fin(s) 528 are deployed. As a result, the increase in landing surface area can help prevent he package 502 from turning over onto a sidewall after landing at the delivery destination.

Figure 5F:
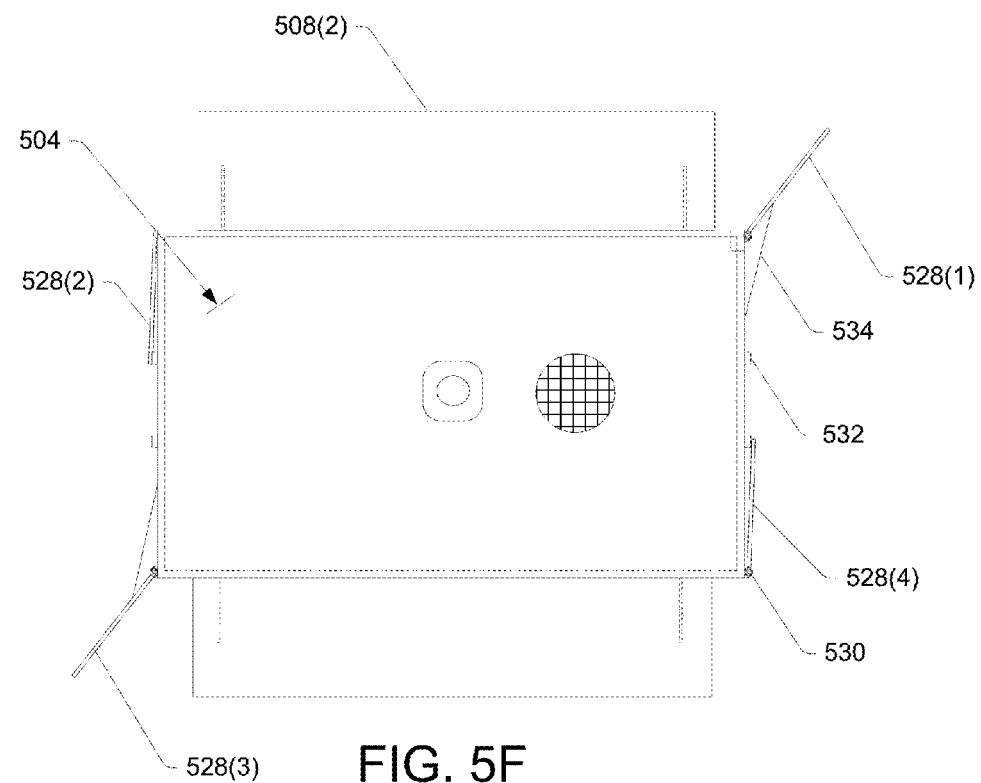

FIG. 5E illustrates a side elevation view of a package 502 that includes four vertical fin(s) 528 at hinge at the vertical sidewall edges of the package 502. FIGS. 5E and 5F depict the package 502 with two vertical fin(s) 528(1) and 528(3) in a deployed position and two vertical fin(s) 528(2) and 528(4) in a stowed position. In various examples, the vertical fin(s) 528 can be included in combination with the sidewall control surfaces 508 described in FIGS. 5A and 5B, and the top side control surfaces 518 described in FIGS. 5C and 5D. In FIG. 5D, the sidewall control surfaces 508 have been omitted for clarity.

In various examples, each vertical fin(s) 528 can be hinged at or near a vertical sidewall edge of the package 502. In some examples, each vertical fin(s) 528 may be coupled to a vertical sidewall edge of the package 502 using a spring hinge 530. The spring hinge 530 can apply a rotational force onto the vertical fin(s) 528 that causes the vertical fin(s) 528 to deploy. In a stowed position, the vertical fin(s) 528 can be secured onto a sidewall surface of the package 502 using a release mechanism 532. The release mechanism 532 can selectively uncouple from the vertical fin(s) 528 in response to receiving an RF signal from the UAV. Once uncoupled, the rotational force of the spring hinge can cause the vertical fin(s) 528 to deploy outward. In some examples, a cord 534 can interface between a position on the vertical fin(s) 528 and a position on a sidewall of the package 502. The cord 534 can limit the rotational travel of the vertical fin(s) 528 that is caused by the spring hinge 530.

Figure 5G:
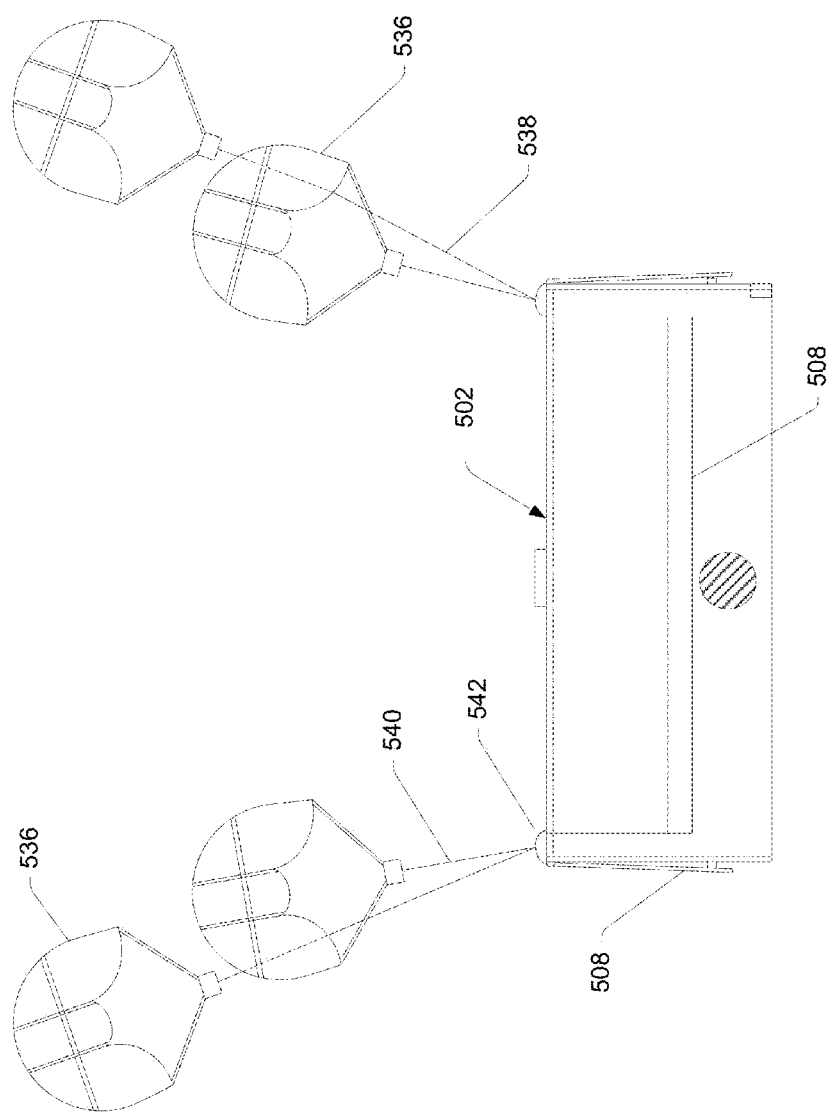

FIG. 5G illustrates an embodiment of the package 502 that can include a plurality of parachutes 536 that deploy from the lid 504 of the package 502. In various examples, the package 502 can include multiple parachutes 536. In the illustrated example, the package 502 can include four parachutes 536, positioned at or near each corner of the lid 504 of the package 502. In some examples, the package 502 can may include one, two, or three parachutes 536 that deploy at or near the lid 504 of the package 502. The parachutes 536 can be secured onto the lid 504 of the package 502 using a long length cord 538 and a short length cord 540. The purpose of using different length cords to ensure that each parachute 536 does not interfere with an adjacent parachute 536 that has deployed.

In various examples, a release mechanism 542 can be used to deploy each parachute 536. The release mechanism 542 can be triggered by an RF signal from the UAV. In various examples, the UAV can simultaneously transmit an RF signal to deploy all parachutes 536 at the same time. In some examples, the deployment of all the parachutes 536 may be staggered in time in order to change the descent path of the package 502. In other examples, less than all of the parachutes 536 may be deployed.

In the illustrated example, the package 502 can include the parachutes 536 in combination with the sidewall control surface 508 described in FIGS. 5A and 5B and the vertical fin(s) 528 described in FIGS. 5E and 5F. In FIG. 5G, the vertical fin(s) 528 have been omitted for clarity.

Figure 6A:
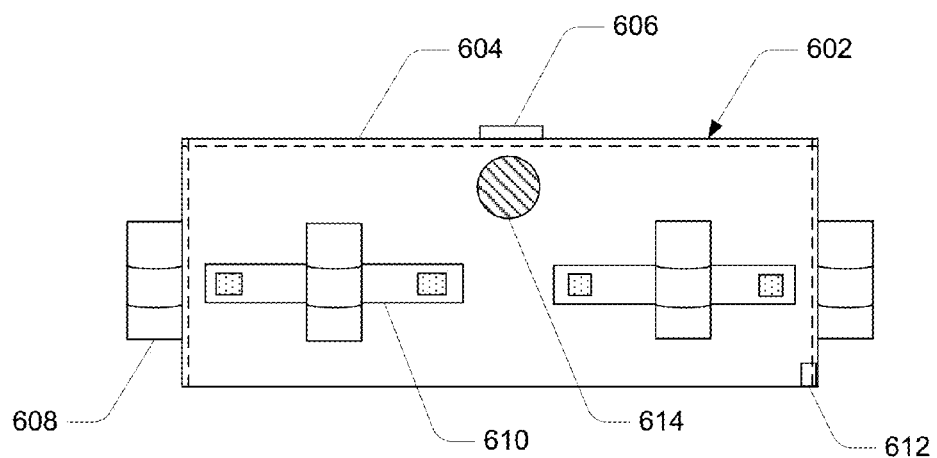
FIGS. 6A and 6B illustrate an example package that includes a plurality of compressed air canisters.
Figure 6B:
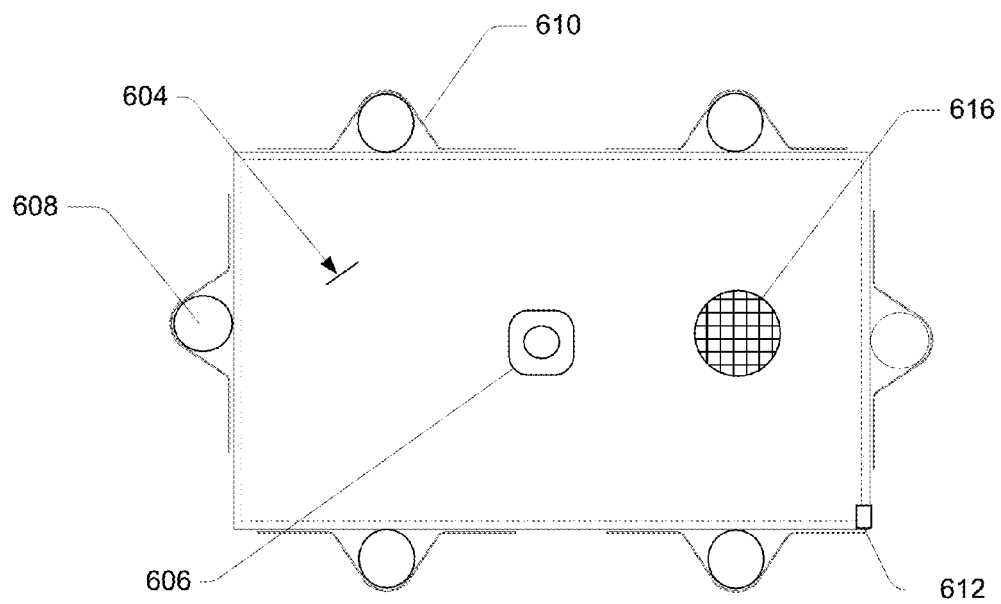

FIGS. 6A and 6B illustrate a package 602 that is deployed by a UAV 102, 202, 302 or 402. In various examples, the package 602 can include a bottom surface, a plurality of sidewalls, with each sidewall having a top rim. The bottom surface and the plurality of sidewalls can combine to form a receptacle in between and an opening at the top rim. In various examples, items for delivery can be securely positioned within the receptacle of the package 602.

In the illustrated example, the package 602 can include a lid 604 hinged to the top rim of at least one sidewall. The lid can be formed to cover the opening of the receptacle. In some examples, the lid 604 can be a separate part that is fitted over the opening at the top rim of the receptacle. In other examples, the lid 604 can be integrated into at least one sidewall, such that the lid 604 is formed by folding down a protruding section of at least one sidewall.

In the illustrated example, the package 602 can include a mounting mechanism 606 that is configured to selectively couple to the lid 604 or a sidewall of the package receptacle. The mounting mechanism 606 can correspond to the mounting mechanism 506. The mounting mechanism 606 can couple the package 602 to the UAV at ground level and selectively uncouple from the UAV during package delivery.

In the illustrated example, the package 602 can include a plurality of compressed air canisters 608. The compressed air canisters 608 can be used to adjust the descent path of the package 602 after the package 602 has been released from the UAV. In various examples, the compressed air canisters 608 can be secured on the sidewalls of the package 602 by a strap 610. In some examples, the strap 610 can be fabricated from a flexible material such as nylon. In various examples, the strap 610 can be bonded on to the sidewalls of the package 602 using a suitable adhesive.

In the illustrated example, the package 602 can include a radio frequency (RF) receiver 612. The RF receiver 612 can be coupled to a sidewall surface inside the receptacle of the package 602. In various examples, the RF receiver 612 can be configured to receive a signal from a UAV that corresponds to releasing compressed air from at least one of the compressed air canisters 608. In some examples, the release of compressed air from compressed air canisters 608 can cause the package 602 to adjust its descent path after being released from the UAV.

In the illustrated example, the package 602 can include unique marks 614 on each sidewall of the package as well as another unique marking 616 on the lid 604 surface. The unique marks 614 on each sidewall surface of the package 602 can be different in color. In addition, the unique marking 616 on the lid 604 surface can be different in color from the unique marks 614 on each sidewall surface of the package 602. As discussed in more detail below in FIG. 7, the different colors of the unique marking 614 and 616 can be used by the UAV to confirm the trajectory path of the package 602 during its descent path.

In some embodiments, the package 602 can include a plurality of parachutes rather than compressed air canisters 608. For example, parachutes can be located at positions around the center of the package, similar to the compressed air canisters 608 positions shown in FIG. 6B. In some examples, the parachutes can be selectively deployed to adjust the descent path of the package 602 after the package 602 has been released from the UAV. For example, if a parachute is deployed at a position left of the center of the package 602, the package 602 trajectory will tend towards the right.

Figure 7:
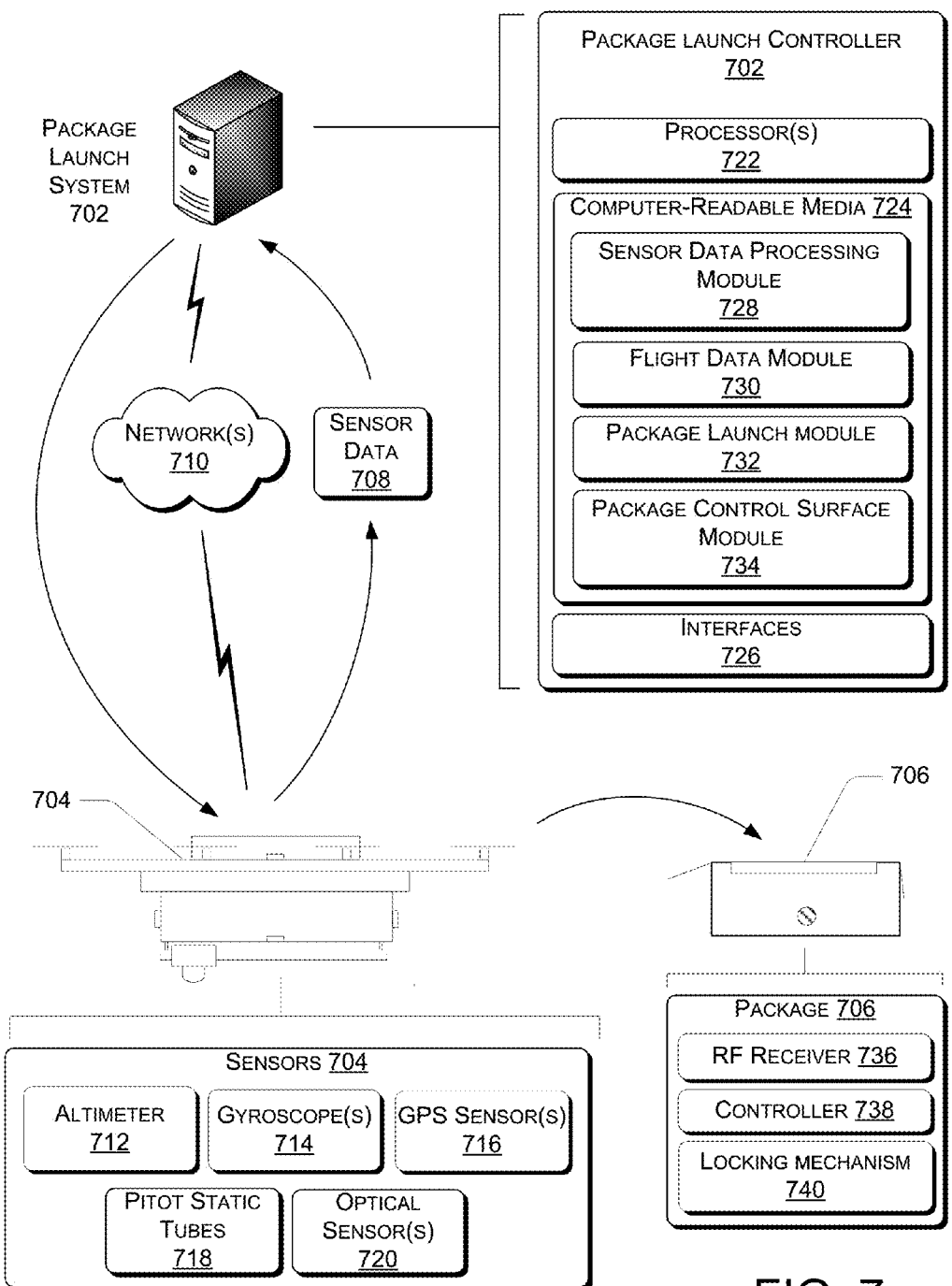
FIG. 7 is a block diagram of components of an example package launch controller that supports package delivery by an unmanned aerial vehicle.

FIG. 7 illustrates a block diagram of components for a package launch controller 702 that supports package delivery by a UAV 704. In various examples, the package launch controller 702 is communicatively coupled to the launch mechanism of the UAV 704 and is configured to determine parameters that cause a package 706 to be deployed from the UAV, and to follow an intended trajectory to a particular destination.

In various examples, the package launch controller 702 can acquire sensor data 708 from the UAV 704 via one or more networks. For example, the one or more network(s) 710 can include public networks such as the Internet, private networks such as an institutional and/or personal intranet, or some combination of private and public networks. Network(s) can also include any type of wired and/or wireless network, including but not limited to local area network (LANs), wide area networks (WANs), satellite networks, cable networks, Wi-Fi network, WiMax networks, mobile communications networks (e.g. 3G, 4G, and so forth), Bluetooth or near field communication (NFC) networks, or any combination thereof.

In various examples the sensor data 708 that is acquired from the UAV 704 can include sensor data 708 associated with the flight characteristics of the UAV 704 vehicle itself as well as sensor data 708 associated with a descent trajectory of the package 706. For example, UAV 704 can be equipped with sensors that include at least an altimeter 712, gyroscope 714, global positioning system (GPS) 716, pitot static tube 718, and optical sensors 720.

In various examples, the altimeter 712 is a pressure instrument that can be used to determine the altitude of the UAV 704. The altimeter 712 can be used to ensure that the UAV 704 is flying at a predetermined altitude for release of the package 706 above a delivery destination. The gyroscope 714 can be used to measure the orientation of the UAV 704. The GPS 716 can be used to determine the geolocation of the UAV 704 as well as the airspeed of the UAV 704 relative to the ground. In some examples, the pitot static tubes can be used to measure a local air velocity at a given point in an airstream. In other words, the pitot static tubes 718 can measure the UAV 704 air speed relative to a headwind, a tail wind, or a crosswind. In some examples, a direction and magnitude of a headwind, tailwind and crosswind can be determined by using the air speeds measured by a pitot static tube 718 and the relative ground speed measured by a GPS 716 instrument.

In some examples, sensor data 708 can also include data from optical sensors 720 on the UAV 704. In various examples, the optical sensors 720 can monitor an orientation of the package 706 after it is released from the UAV 704. Particularly, the optical sensors 720 can include digital cameras that monitor unique marks on the sidewalls and lid of the package 706 while the package is descending. In various examples, the unique marks on each sidewall surface and lid of the package 706 are different in color. As a result, a view of a particular color imprint, or sequence of unique marks via the optical sensors 720 can help the package launch controller 702 to discern an orientation of the package 706 during descent. For example, if the optical sensors 720 intermittently view some unique marks, the package launch controller 702 may determine that the package 706 is spinning. In response, the package launch controller 702 can cause the UAV 704 to deploy one or more control surfaces to stabilize the package 706 during descent. In other examples, the view of particular unique marks via the optical sensors 720 could help the package launch controller 702 determine that the package 706 is orientated in such a way that a sidewall is likely to strike the ground first, rather than a bottom surface of the package 706. As a result, the package launch controller 702 can cause the UAV 704 to deploy one or more control surfaces that re-orient the package 706 in such a way that the bottom surface of package 706 strikes the ground first.

In various examples, the package launch controller 702 can include one or more processor(s) 722 operably connected to the computer-readable media 724. The package launch controller 702 can also include one or more interfaces 726 that enable communication with other networked devices, such as the UAV 704. The one or more interfaces 726 can include network interface controllers (NICs), I/O interfaces, or other types of transceiver devices to send and receive communications over a network. For simplicity, other computers are omitted from the illustrated UAV 704.

The computer-readable media 724 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 724 can include a sensor data processing module 728, a flight data module 730, a package launch module 732, and a package control surface module 734. In various examples, the sensor data processing module 728 can receive the sensor data 708 from the UAV 704. The sensor data processing module 728 can further process the sensor data to determine environmental conditions such as a magnitude and direction of wind, as well as a free stream airspeed of the UAV 704, and ground speed of the UAV 704.

In various examples, the flight data module 730 can receive processed sensor data from the sensor data processing module 728 to determine an orientation of the UAV 704 immediately before the package is released. In some examples, the UAV 704 may alter its direction of flight to head directly into a headwind before releasing the package 706. By flying directly into a headwind, the UAV 704 may reduce the force by which it releases the package.

In some examples, the package launch module 732 can receive processed sensor data from the sensor data processing module 728 to determine the magnitude of the release force by which package is to be released from the UAV 704. In various examples, factors that can affect the magnitude of the release force include the weight of the package 706, the surface area of the package 706 that is perpendicular to the horizontal motion of the UAV 704, and the magnitude and direction of wind relative to the direction and motion of the UAV 704. In response to determining the magnitude of the release force, the package launch module 732 can transmit a signal to the UAV 704 that causes the UAV 704 to release the package with the determined release force.

In various examples, package control surface module 734 can receive processed sensor data from the sensor data processing module 728 to determine whether to deploy one or more control surfaces of the package 706 after the package 706 is released from the UAV 704. In some examples, the processed sensor data can include views of unique marks that indicate that the package 706 is descending in an improper orientation. As a result, the package control surface module 734 can determine that one or more control surfaces can be deployed to help re-orient package. In some examples, the package control surface module 734 can also determine a particular sequence of deploying individual control surfaces.

In various examples, the package control surface module 734 can determine a sequence of deploying the one or more control surfaces that allows the package 706 to alter its descent path. In some examples, the descent path may be altered to avoid an obstruction such as a tree or other structure such as a carport. In other examples, the descent path may be altered in order to allow the package to be delivered on a balcony of particular high-rise building.

In some embodiments, the package control surface module 734 can transmit a signal to the UAV 704 that indicates the determined sequence of deploying the one or more control surfaces. In response, the UAV 704 can further transmit an RF signal to the package 706 that instructs the package 706 to deploy the one or more control surfaces is the prescribed sequence.

In various examples, the package 706 can receive the RF signal from the UAV 704 at an RF receiver 736 located within the package 706 receptacle. The package 706 can further include a controller 738. In response to receiving an RF signal from the UAV, the controller 738 can cause one or more locking mechanisms 740 to unlatch and deploy corresponding control surfaces on the package 706. As discussed earlier in more detail in FIG. 5, the locking mechanisms 740 can be situated on the package 706 to fix the one or more control surfaces into a closed position. Once the locking mechanisms 740 unlatch the control surfaces, airflows during descent can cause the control surfaces to automatically deploy. In some examples, the control surfaces can include flat panels as depicted in FIG. 7. In other examples, the control surfaces can include parachutes, aerodynamic flaps, or slats.

Figure 8:
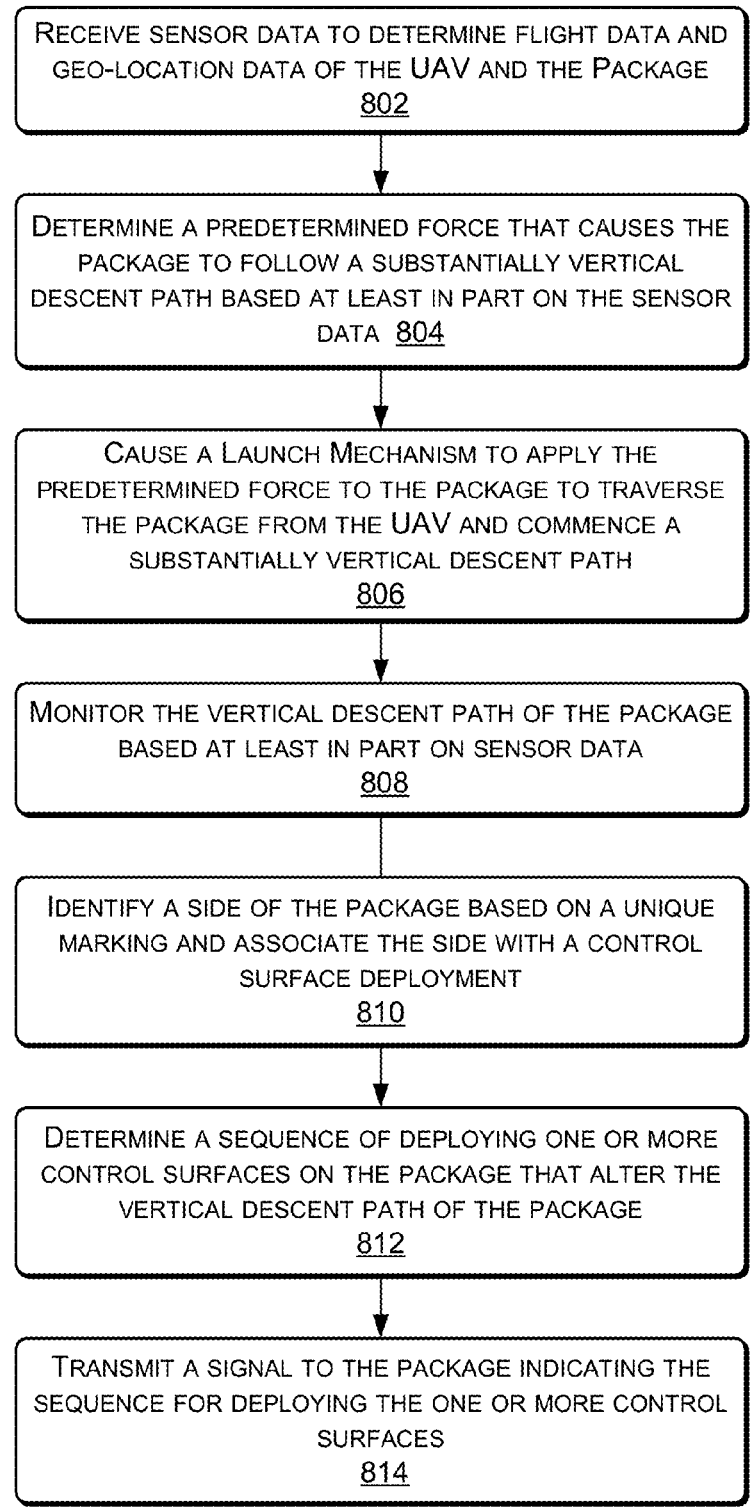
FIG. 8 is a flow diagram of a package delivery system on an UAV causing the launch of a package. The flow diagram further describes monitoring the descent of package to transmitting signals to deploy control surfaces on the package to ensure safe delivery to the delivery destination.

FIG. 8 illustrates a flow diagram of a package delivery system on a UAV that causes the launch of a package. The flow diagram further describes monitoring the descent of package to transmitting signals to deploy control surfaces on the package to ensure safe delivery to the delivery destination.

At 802, a package launch and control system can receive sensor data from one or more sensors on the UAV. The sensor data can be used to determine flight data and geo-location data of the UAV and the package. In some examples, the flight data can include wind speed a wind direction, as well as a package launch altitude and launch geolocation.

At 804, a package launch module of the package launch and control system can determine a predetermined force that can cause the package to follow a vertical descent path based at least in part on the sensors data. The predetermined force is nominally equivalent to the magnitude of the acceleration force of the UAV at the point in time when the UAV releases the package. In some examples, the predetermined force can be decreased or increased from its nominal value in response to the prevalence of a headwind or a tailwind. Other factors that can affect the determination of the predetermined force include the surface area of the package that is perpendicular to the horizontal motion. For example, a package with a large surface area is likely to cause significant drag, meaning that less force is required to establish a vertical descent path.

At 806, UAV package launch assist apparatus causes a launch mechanism to apply the predetermined force to the package. In response, the package may traverse from the UAV and commence a substantially vertical descent path. In various examples, the launch mechanism can include a pneumatic actuator, a spring coil, electromagnets, or a parachute that is attached directly onto the package.

At 808, once the package is released from the UAV, the UAV can monitor the vertical descent path of the package using one or more optical sensors. In some examples, the package may include unique markings on differences sidewalls, such that the orientation and trajectory of the package be determined by identifying which colored imprints are visible to the optical sensors of the UAV.

At 810, the UAV can identify a side of the package based on a unique marking viewed through the one or more optical sensors. The UAV may also associate a particular control surface with the side of the package. For example, if a left side of the package is identified by unique markings, then a control surface on the right side of the package may be associated with the left side of the package. The purpose of associating a control surface that is opposite to the identified surface is because a change in orientation of a particular side of the package generally requires a control surface to be deployed on the opposite side of the package.

At 812, in response to determining that the package requires a course correction, the package launch and control system can determine a sequence of deploying one or more control surfaces on the package that can alter the vertical descent path of the package. In some examples, the vertical descent path may be altered to avoid an obstruction such as a tree or a carport. In other examples, the one or more control surfaces may be deployed to restore stability to the descent orientation of the package.

At 814, an RF module of the package launch and control system can transmit a signal to the package indicating the sequence for deploying the one or more control surfaces. In various examples, a portion but not all of the control surfaces can be deployed in order to generate the required descent correction or orientation adjustment.

Figure 9:
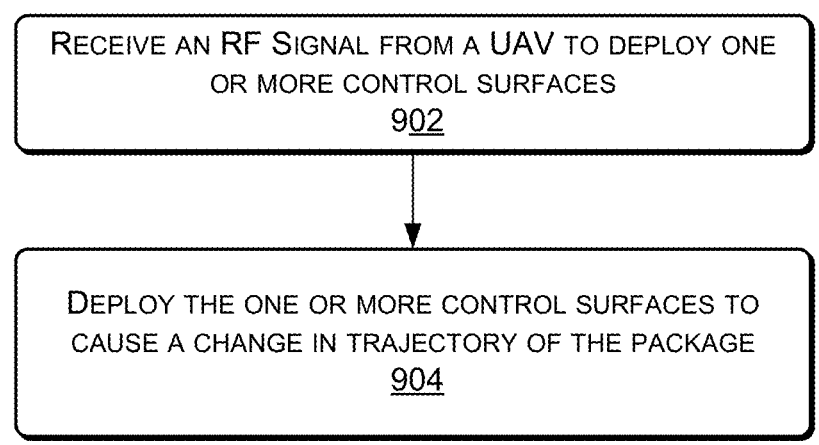
FIG. 9 is a flow diagram of package receiving an RF signal from a UAV and deploying one or more control surfaces in response to the RF signal.

FIG. 9 illustrates a flow diagram of a package receiving an RF signal from a UAV and deploying one or more control surface in response to the RF signal.

At 902, the package can receive an RF signal from a UAV to deploy one or more control surfaces on the package. The one or more control surfaces can be deployed to cause a change to the trajectory of the vertical descent path of the package. In some examples, the change in trajectory can help avoid an obstruction in the descent path of the package. In various examples, the RF signal can include instructions to include a portion of the control surfaces. In other examples, the RF signal can include instructions to deploy all control surfaces. In yet another example, the RF signal can include instructions to deploy some or all of the control surfaces in a particular sequence. The particular sequence may assist the package in avoiding obstructions or regaining a more stable orientation.

At 904, the RF signal can cause the one or more control surfaces of the package to deploy, thereby changing the trajectory of the package. In some examples, the one or more control surfaces may comprise of flat panels that are hinged about the top rim of each sidewall of the package. In these examples, the control surfaces can be deployed by unlatching a locking mechanism that holds the controls surfaces in a closed position. Alternatively, if the one or more control surfaces comprise of compressed air canisters, the control surfaces can be deployed by casing the compressed air canisters to expel compressed air for a predetermined period of time.

CONCLUSION

Although the subject matter has been described in language specific to structural features and/or methodological acts, it is to be understood that the subject matter defined in the appended claims is not necessarily limited to the specific features or acts described herein. Rather, the specific features and acts are disclosed as illustrative forms of implementing the claims.

What is claimed:

1. An Unmanned Aerial Vehicle (UAV) to launch a package during flight, the UAV comprising:
   a launch mechanism coupled to the UAV, the launch mechanism configured to apply a predetermined force to a package, the predetermined force to cause the package to be released from the UAV in a second direction that is opposite a first direction of travel of the UAV and commence a vertical descent path to a delivery destination;
   a coupling structure that is coupled to the launch mechanism, the coupling structure configured to selectively couple the package to the launch mechanism during transport from ground level to a launch altitude and a launch geo-location, and to selectively uncouple from the launch mechanism when the UAV reaches the launch altitude and at the launch geo-location; and
   a package launch and control system communicatively coupled to at least the launch mechanism of the UAV, the package launch and control system further comprising:
   one or more processors;
   memory to store instructions executable by the one or more processors;
   one or more sensors to determine flight data and geo-location data of the UAV and the package, wherein the flight data and location data of the package is determined at a time after the package is released from the UAV;
a radio frequency (RF) module configured to transmit data to the package;
a package launch module stored in the memory and executable on the one or more processors, the package launch module configured to determine the predetermined force that causes the package to follow the vertical descent path to the delivery destination based at least in part on data from the one or more sensors; and
a package control surface module stored in the memory and executable on the one or more processors, the package control surface module configured to:
determine a control to deploy one or more control surfaces on the package that alter the vertical descent path of the package after the package is released from the UAV, wherein the one or more control surfaces are independently deployable; and
transmit, via the RF module to the package, a signal indicating the control to deploy the one or more control surfaces on the package.

2. The UAV of claim 1, wherein the launch mechanism includes at least one of a pneumatic actuator, a spring coil, or a drogue parachute to pull the package from the UAV.

3. The UAV of claim 1, wherein the one or more sensors include at least one optical sensor and wherein the package control surface module is further configured to:
monitor the vertical descent path of the package based at least in part on data from the at least one optical sensor;
determine an obstruction between the vertical descent path and a landing location; and
determine the control for deploying the one or more control surfaces to adjust the vertical descent path of the package in response to determining that the package is likely to pass through the obstruction without the deploying.

4. The UAV of claim 1, wherein the one or more control surfaces include at least one of a sidewall control surface, a top side control surface, or a vertical fin.

5. A package launch assist apparatus comprising:
a launch mechanism coupled to an Unmanned Aerial Vehicle (UAV), the launch mechanism configured to apply a predetermined force to a package while the UAV is in-flight, the predetermined force to cause the package to be released from the UAV and commence a substantially vertical descent to a delivery destination;
a package launch controller coupled to the UAV, the package launch controller comprising:
one or more processors;
memory to store instructions executable by the one or more processors;
one or more sensors to determine flight data and location data of the UAV and the package;
a radio frequency (RF) module configured to transmit data to the package;
a package control surface module stored in the memory and executable on the one or more processors, the package control surface module configured to:
determine a control for deploying one or more control surfaces on the package that alter a vertical descent path of the package, wherein the one or more control surfaces are independently deployable; and
transmit, via the RF module to the package, a signal indicating the control for deploying the one or more control surfaces on the package.

6. The package launch assist apparatus of claim 5, wherein the predetermined force is applied to the package while the UAV is in flight; and
wherein a magnitude of the predetermined force is substantially equivalent to an acceleration of the UAV at a particular point in time when the package is released from the UAV.

7. The package launch assist apparatus of claim 5, wherein the one or more control surfaces move from a first position to a second position after deployment, the first position being a stowed position where the one or more control surfaces are oriented to nestle alongside a surface of the package, and the second position being a deployed position where the one or more control surfaces protrude into an airstream.

8. The package launch assist apparatus of claim 5, wherein the one or more control surfaces include one or more parachutes that move from a first position to a second position after deployment, the first position being a stowed position where the one or more parachutes are concealed, and the second position being a deployed position where the one or more parachutes are deployed by a string.

9. The package launch assist apparatus of claim 5, wherein the one or more sensors include at least one optical sensor, and wherein the package control surface module is further configured to identify an orientation of the package during the substantially vertical descent by capturing images of unique marks on different surfaces of the package.

10. The package launch assist apparatus of claim 5, wherein the launch mechanism includes a coupling structure that is coupled to the launch mechanism, the coupling structure configured to selectively couple the package to the launch mechanism during transport from ground level to a launch altitude and a launch geo-location, and to uncouple from the launch mechanism at the launch altitude and at the launch geo-location.

11. The package launch assist apparatus of claim 10, wherein the launch mechanism further comprising at least one of a pneumatic actuator or a spring coil to cause the coupling structure to traverse along a guide rail.

12. The package launch assist apparatus of claim 10, wherein the launch mechanism further comprises a parachute that is coupled to the package, a deployment of the parachute to cause the coupling structure to traverse along a guide rail; and wherein
the parachute is configured to uncouple from the package at a same point in time that the coupling structure is configured to uncouple from the launch mechanism.

13. A package comprising:
a top side, a bottom side, and a plurality of sidewalls that span between the top side and the bottom side to create a cavity;
a mounting mechanism configured to selectively couple the top side to a coupling structure of an unmanned aerial vehicle (UAV), the mounting mechanism to couple to the coupling structure of the UAV during transport to a launch altitude and a geo-location and to selectively uncouple from the coupling structure of the UAV when the UAV reaches the launch altitude and the geo-location;
a radio frequency (RF) receiver located inside of the package, the RF receiver configured to receive data from an UAV; and one or more control surfaces that are coupled to an exterior surface of at least one of the plurality of sidewalls of the package, the one or more control surfaces configured to deploy to cause a change in trajectory of the package at a point in time after the package is released from the UAV, wherein the one or more control surfaces are independently deployable.

14. The package of claim 13, further comprising:

at least one top side control surface that is coupled to the top side of the package by multiple cords, the multiple cords having different lengths;

multiple release mechanisms that are secured onto the top side of the package, individual ones of the multiple release mechanisms selectively coupling to individual ones of the multiple cords; and wherein the RF receiver is further configured to receive data from the UAV to selectively unlatch one or more of the multiple release mechanisms causing the at least one control surface to deploy at a predetermined angle, the predetermined angle being determined by an unlatching of individual ones of the multiple cords of different length.

15. The package of claim 13, wherein the one or more control surfaces include at least one of aerodynamic flaps or slats that when deployed cause drag that alters a trajectory of the package during descent.

16. The package of claim 13, further comprising:
a plurality of locking mechanisms that secure individual ones of the one or more control surfaces in a stowed position that is nestled alongside a surface of the package; and
a controller that causes at least some locking mechanisms of the plurality of locking mechanisms to unlatch in response to receiving an RF signal from the UAV, the unlatching to cause individual ones of the one or more control surfaces to extend outward from the package to deploy.

17. The package of claim 13, wherein an external surface of individual ones of the plurality of sidewalls are designated with a unique marking that provide a visible indication of an orientation of the package to an optical sensor of the UAV.

18. The package of claim 17, wherein the unique marking on the individual ones of the plurality of sidewalls comprise of different colors.

19. The package of claim 13, wherein an RF signal received from the UAV, via the RF receiver, causes some, but not all of individual ones of the one or more control surfaces to deploy.

20. The package of claim 13, wherein the one or more control surfaces comprise compressed air canisters that are coupled to the plurality of sidewalls of the package; and
wherein a RF signal received from the UAV, via the RF receiver, causes a control of individual ones of the compressed air canisters to release compressed air.

* * * * *